United States Patent
Gerea et al.

(10) Patent No.: US 9,465,122 B2
(45) Date of Patent: Oct. 11, 2016

(54) METHOD FOR ACQUIRING SEISMIC DATA

(75) Inventors: Constantin Gerea, Pau (FR);
Jean-Marc Mougenot, Pau (FR);
Francis Clement, Pau (FR)

(73) Assignee: TOTAL SA, Courbevoie (FR)

( * ) Notice: Subject to any disclaimer, the term of this patent is extended or adjusted under 35 U.S.C. 154(b) by 266 days.

(21) Appl. No.: 14/000,795

(22) PCT Filed: Feb. 20, 2012

(86) PCT No.: PCT/FR2012/050358
§ 371 (c)(1),
(2), (4) Date: Aug. 21, 2013

(87) PCT Pub. No.: WO2012/114033
PCT Pub. Date: Aug. 30, 2012

(65) Prior Publication Data
US 2013/0322211 A1 Dec. 5, 2013

(30) Foreign Application Priority Data

Feb. 23, 2011 (FR) .................................. 11 51481

(51) Int. Cl.
*G01V 1/18* (2006.01)
*G01V 1/20* (2006.01)
(Continued)

(52) U.S. Cl.
CPC ............... *G01V 1/181* (2013.01); *G01V 1/006* (2013.01); *G01V 1/36* (2013.01); *G01V 2210/125* (2013.01); *G01V 2210/169* (2013.01)

(58) Field of Classification Search
CPC ........ G01V 1/36; G01V 1/181; G01V 1/006; G01V 2210/125; G01V 2210/169
USPC ............................................... 367/37, 38, 40
See application file for complete search history.

(56) References Cited

U.S. PATENT DOCUMENTS

| 5,402,391 | A | * | 3/1995 | Cordsen | .................... G01V 1/20 367/56 |
| 5,487,052 | A | * | 1/1996 | Cordsen | .......................... 367/56 |
| 2010/0054083 | A1 | | 3/2010 | Stork | |

FOREIGN PATENT DOCUMENTS

| EP | 2 166 378 A2 | 3/2010 |
| EP | 2 169 431 A2 | 3/2010 |

(Continued)

OTHER PUBLICATIONS

Halliday et al., "Interferometric ground-roll removal: Attenuation of scattered surface waves in single-sensor data," Geophysics, Vol. 75, No. 2 (Mar.-Apr. 2010); p. SA15-SA25.*

(Continued)

*Primary Examiner* — Daniel L Murphy
(74) *Attorney, Agent, or Firm* — Patterson Thuente Pedersen, P.A.

(57) ABSTRACT

Receiver lines arranged in an area to be explored are provided with geophones in respective receiver positions for measuring seismic waves from the subsoil. The receiver lines include first parallel lines and second lines parallel to the first lines and located in intermediate positions between the first lines. Seismic waves are emitted from source positions located along the first receiver lines, and seismic data, representing waves measured by the various geophones in response to the emitted waves, are obtained. Said first seismic data are processed by seismic interferometry in order to estimate other seismic data representing responses, in at least some of the receiver positions, to waves emitted from a virtual source located in a receiver position along a second line.

6 Claims, 3 Drawing Sheets

(51) Int. Cl.
*G01V 1/36* (2006.01)
*G01V 1/00* (2006.01)

(56) References Cited

FOREIGN PATENT DOCUMENTS

| WO | WO 2008/070595 A2 | 6/2008 |
| WO | WO 2008/070597 A2 | 6/2008 |
| WO | WO 2008/106511 A1 | 9/2008 |
| WO | WO 2010/120418 A1 | 10/2010 |

OTHER PUBLICATIONS

Andrew Curtis: "Source-Receiver Seismic Interferometry", Society of Exploration Geophysicists—Conference Paper, Sep. 2009, pp. 3655-3659, XP002667859, Houston.
David Halliday and Andrew Curtis: "An interferometric theory of source-receiver scattering and imaging", Geophysics, Society of Exploration Geophysicists, US, vol. 75, No. 6, Nov. 1, 2010, pp. SA95-SA103, XP001561997, ISSN: 0016-8033, DOI: 10.1190/1.3486453.

* cited by examiner

METHOD FOR ACQUIRING SEISMIC DATA

The present application is a National Phase entry of PCT Application No. PCT/FR2012/050358, filed Feb. 20, 2012, which claims priority from FR Application No. 1151481 filed Feb. 23, 2011, said applications being hereby incorporated by reference herein in their entirety.

FIELD OF THE INVENTION

The present invention relates to seismic imaging techniques used in particular for hydrocarbon prospecting in the subsoil.

BACKGROUND OF THE INVENTION

It is known, particularly in oil exploration, to determine the position of oil reservoirs from the results of seismic measurements performed from the surface or in wells. In the reflection seismology technique, these measurements involve emitting a wave into the subsoil and measuring a signal including various reflections of the wave on the geological structures looked for. These structures are typically surfaces separating distinct materials, faults . . .

The measurements are processed for building a model of the subsoil, in general in the form of seismic images. These images may be two-dimensional (seismic sections) or three-dimensional (seismic blocks). A seismic image is composed of pixels whose intensity is representative of a seismic amplitude depending on local variations of the impedance. The geophysicists are used to analyzing such seismic images. Through visual observation, they can distinguish areas of the subsoil having different features in view of determining the structure of the subsoil.

For offshore exploration, there is generally use of hydrophones distributed along receiver lines pulled by vessels and a source such as a compressed air gun to emit seismic waves in the marine environment.

In desert or easy access plain areas, receiver lines are used, along which geophones are arranged, and the shots are generally performed with vibrating sources carried by special vehicles moving in the studied area.

In mountainous or foothill regions that are inaccessible to the vibrators, the shots are performed using explosives transported by men or by helicopter to the desired locations.

In terrestrial environments, it is necessary to prepare the site in order to install receiver lines. Most often, the geophones are buried and linked to each other via cable networks transporting the signals useful for acquiring data. It is also possible to use geophones operating with a wireless station sharing the synchronization information via radio. The implementation of the sources also requires a preparation of the site so as to allow the burial of the explosives or the circulation of the vibrator trucks. Once the measurements are completed, the lines are dismantled and the site must be returned to its initial condition. These field operations contribute significantly to the complexity and cost of the exploration. In desert areas these constraints remain manageable. However, when it is desired to explore the subsoil of regions where access is more difficult or where the ground presents relief and/or vegetation, in particular in mountainous or foothill regions, the cost of a measurement campaign, related to the arrangement of the receiver lines, to the transport or installation of the seismic sources, to the preparation and return to the initial condition of the site can become very significant, if not prohibitive.

It is possible to limit the cost of the exploration procedure by reducing the spatial density of the shooting positions of the receiver positions. However, this degrades the quality of the seismic images obtained due to a reduced spatial sampling.

In orthogonal acquisition geometries of relatively low ("sparse") density for producing three-dimensional seismic imaging (3D), the shots and receivers are located at positions that are relatively close to each other along the individual lines, e.g. a few tens of meters, whereas the distance between these lines is relatively large, e.g. in the order of 1 km. The line interval governs the seismic fold. This seismic fold, corresponding to the number of times a given zone of the subsoil is exposed by the emitted seismic waves, decreases when the line interval increases. The fold resulting from these sparse geometries is poor at small and medium depths. Combined with the strong heterogeneities of the speed close to the surface in mountainous areas, this poor fold leads to low-quality seismic data, at small and medium depths, the measured signal being dominated by high order reverberations, scattering, volume wave-surface wave couplings. Such conventional sparse geometries are suitable mainly for deep exploration, but give bad results for representing shallow structures.

When the orthogonal geometry is too sparse, the fold is not optimal at small or medium depth, and gives rise to artifacts that cannot be properly attenuated by the migration technique, even in the ideal case where the model of the subsoil would be perfectly known for the imaging.

There is therefore a need to improve the 3D seismic imaging techniques using relatively sparse imaging geometries.

SUMMARY OF THE INVENTION

A method for acquiring seismic data is proposed, comprising:
   arranging receiver lines in an area to be explored, each receiver line including a plurality of geophones at respective receiver positions for measuring seismic waves from the subsoil, the receiver lines including first receiver lines substantially parallel to each other and second receiver lines substantially parallel to the first receiver lines and located at intermediate positions between the first receiver lines;
   emitting seismic waves into the subsoil in the area to be explored from source positions located along the first receiver lines;
   obtaining first seismic data representing seismic waves measured by the geophones of the first and second receiver lines in response to the emitted seismic waves; and
   processing the first seismic data by seismic interferometry to estimate second seismic data representing responses, at at least some of the receiver positions, to seismic waves emitted from a virtual source located at a receiver position along a second receiver line.

Shots are performed along the receiver lines, but only part of these lines. Seismic interferometry makes it possible to rebuild virtual shots at the positions of the physical receivers of the other lines. The second seismic data corresponding to these virtual shots may be combined with the first seismic data measured in a previous depth migration, e.g. reverse-time migration (RTM), process.

In a particular embodiment of the method, some at least of the geophones of the second receiver line belong to wireless equipment. They can thus be provided without having to clear a wayleave zone on the site for the installation of full receiver lines, such as the first receiver lines, that are further equipped for the circulation of the vehicle carrying the seismic source.

The spacing between the first receiver lines is typically more than 300 m, while the spacing of the receiver positions along the receiver lines is less than 100 m.

The second receiver lines may be placed substantially halfway between two adjacent first receiver lines.

The shots may be performed in a hybrid parallel configuration, some source positions being transversally offset with respect to the receiver positions along the first receiver lines.

The technique proposed is particularly well adapted to the exploration of the subsoil in mountainous and/or foothill areas.

BRIEF DESCRIPTION OF THE DRAWINGS

Other features and advantages of the present invention will appear in the description below of a non-limiting exemplary embodiment, reference being made to the attached drawings, in which.

DESCRIPTION OF EMBODIMENTS

Figure 1:
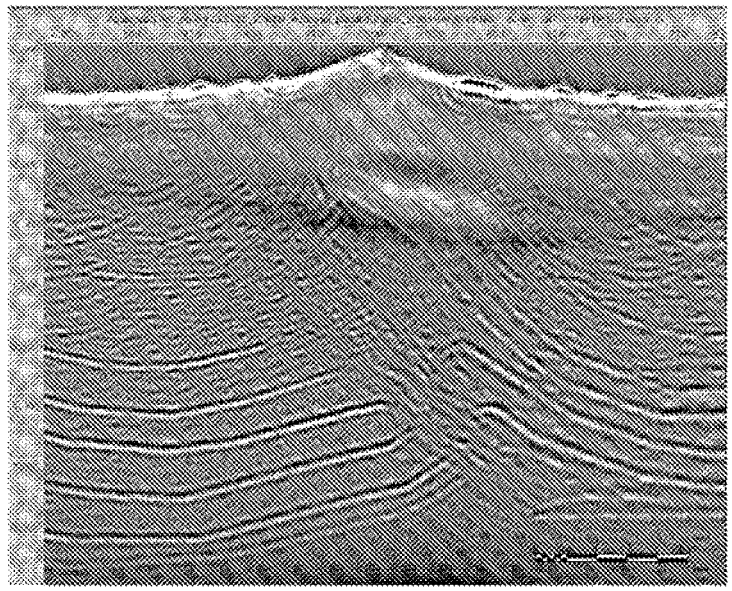
FIG. 1 is a seismic image of a foothill area obtained with a linear sparse acquisition geometry.
Figure 2:
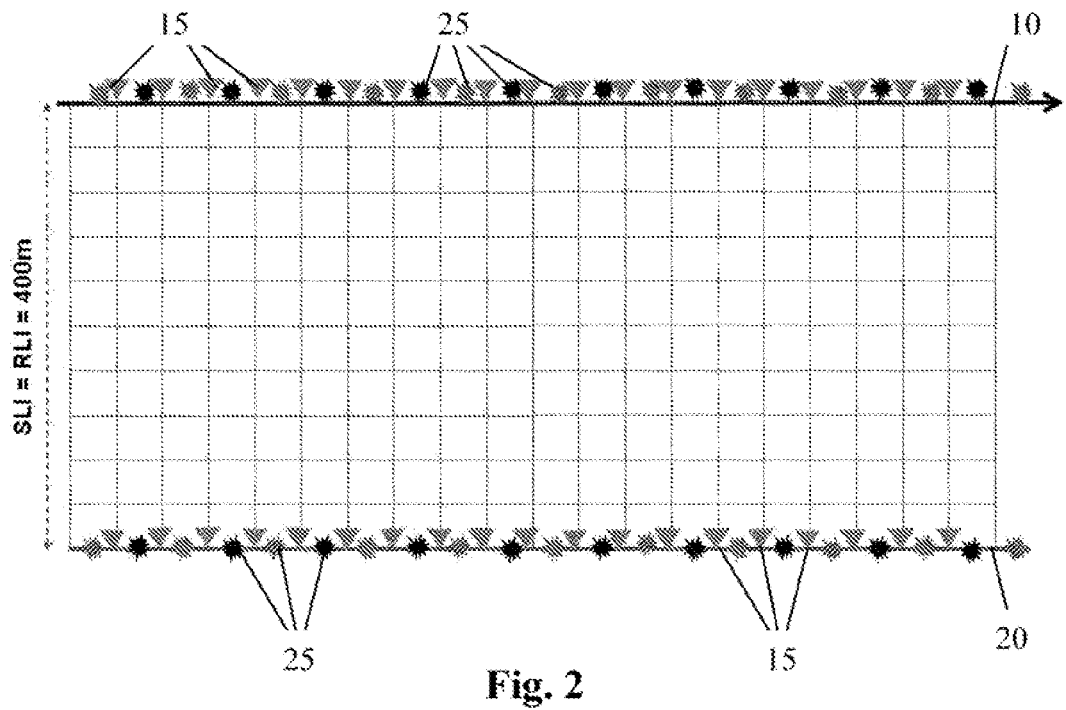
FIG. 2 is a diagram showing the linear acquisition geometry used to obtain the image of FIG. 1.

FIG. 1 illustrates an example of seismic image obtained from synthetic data with a sparse geometry for acquiring seismic data, of the type represented in FIG. 2. In this example, the receiver lines 10, 20 have between them a horizontal spacing RLI (Receiver Line Interval) of 400 m, while along the lines 10, 20, the geophones 15, represented as triangles in the figure, are spaced from each other by 40 m (the square cells in FIGS. 2, 3 and 5 have a 40 m×40 m dimension).

In FIG. 2, the explosion symbols represent the horizontal positions of the seismic source 25 (or seismic sources) used to perform the shots after which the receivers 15 record the seismic data. In this example, the shots are performed along the same lines 10, 20 as the ones where the receivers 15 are located. The spacing SLI (Shot Line Interval) between the source lines is therefore the same as the RLI one between the receiver lines.

For a series of shots, performed at source positions 25 located along a line 10, 20, seismic recordings are performed at receiver positions distributed along a plurality of lines. Two lines only are represented in FIG. 2, but in practice the number of lines is bigger. For example, five receiver lines A, B, C, D, E are installed in parallel, and the source is moved along the central line C to perform shots at the prescribed source positions. Once this series of shots is completed, the line A at one end is dismantled and then reinstalled further, on the other side of the line E, and then the source is moved along the line D to perform new shots there. This "roll along" technique to install and dismantle lines is frequently used in the art of terrestrial seismic exploration.

Figure 3:
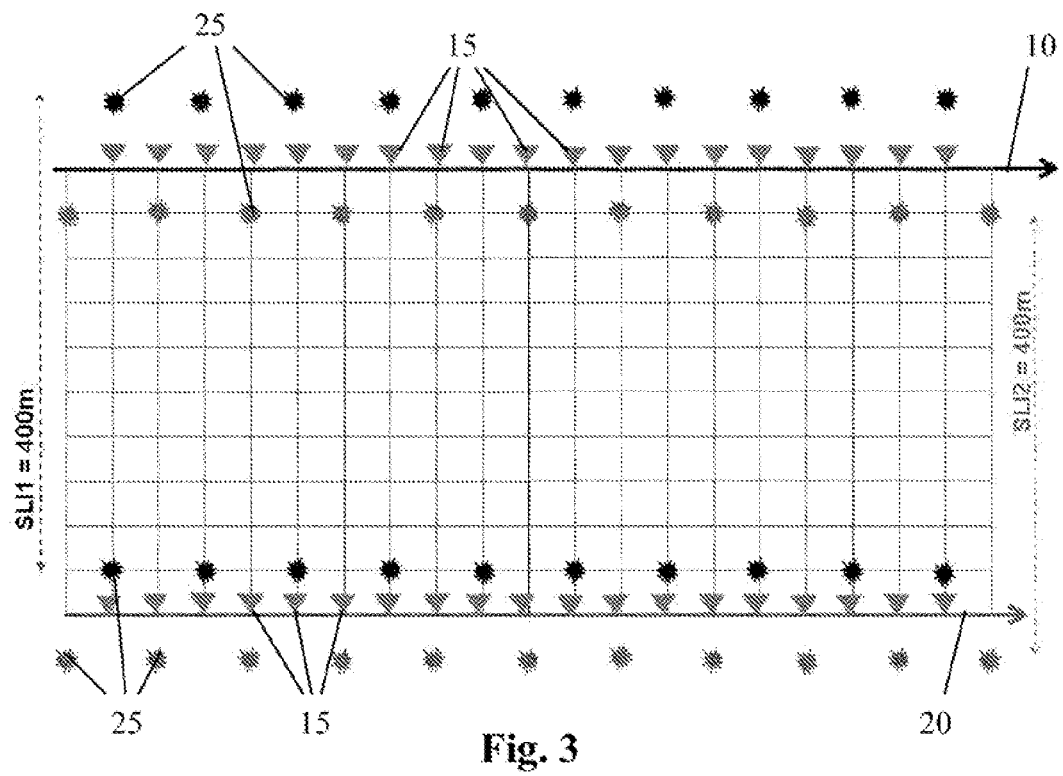
FIG. 3 is a diagram showing a hybrid linear acquisition geometry usable for obtaining 3D seismic images.

FIG. 3 illustrates another possible configuration of the seismic sources 25 along the receiver lines 10, 20 arranged in the same manner as in FIG. 2. In this hybrid configuration, the source positions 25 are transversally offset with respect to the receiver positions 15 along the receiver lines 10, 20. This configuration in staggered rows along all or part of the lines improves the distribution of the horizontal offsets without requiring additional receivers or additional shots.

The seismic section of FIG. 1 was obtained via a migration technique from the signal of the geophones 15 with a density of 33 shots per km$^2$, the shots being performed along parallel lines 10, 20 according to the configuration of FIG. 2. It can be seen that at small and medium depths, the quality of the seismic image is mediocre due to a fairly high level of noise.

Figure 4:
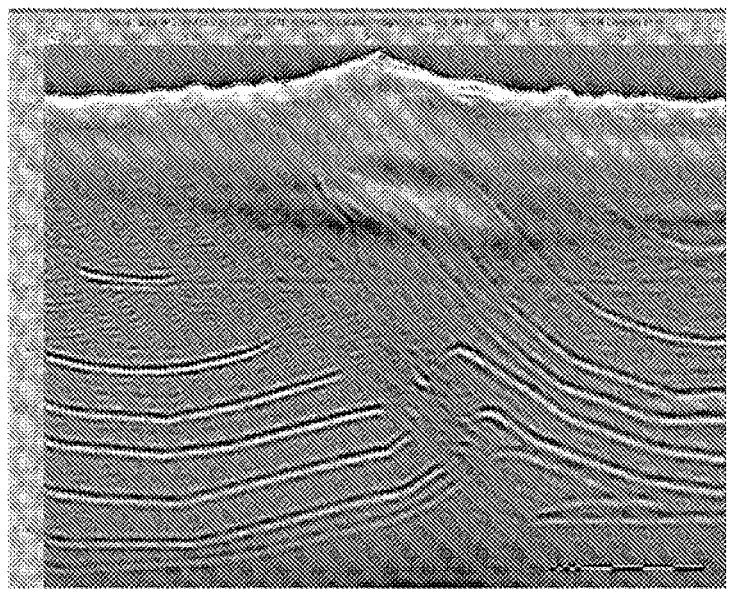
FIG. 4 is a seismic image of the same foothill area as in FIG. 1, obtained with a doubled density for the sources and receiver.

Quality is substantially improved in the seismic section of FIG. 4 which has been obtained from the same synthetic model as the one of FIG. 1, but with a doubled density (66 shots per km$^2$), i.e. the spacing SLI=RLI between the receiver/shot lines 10, 20 was 200 m instead of 400 m.

The improvement of the quality implies doubling the cost of the works to be performed in order to install the receiver lines and the sources. This may be particularly problematic in mountainous or foothill areas.

Interferometric techniques are used according to the invention to limit the incidence of this problem while producing seismic images of satisfying quality.

Figure 5:
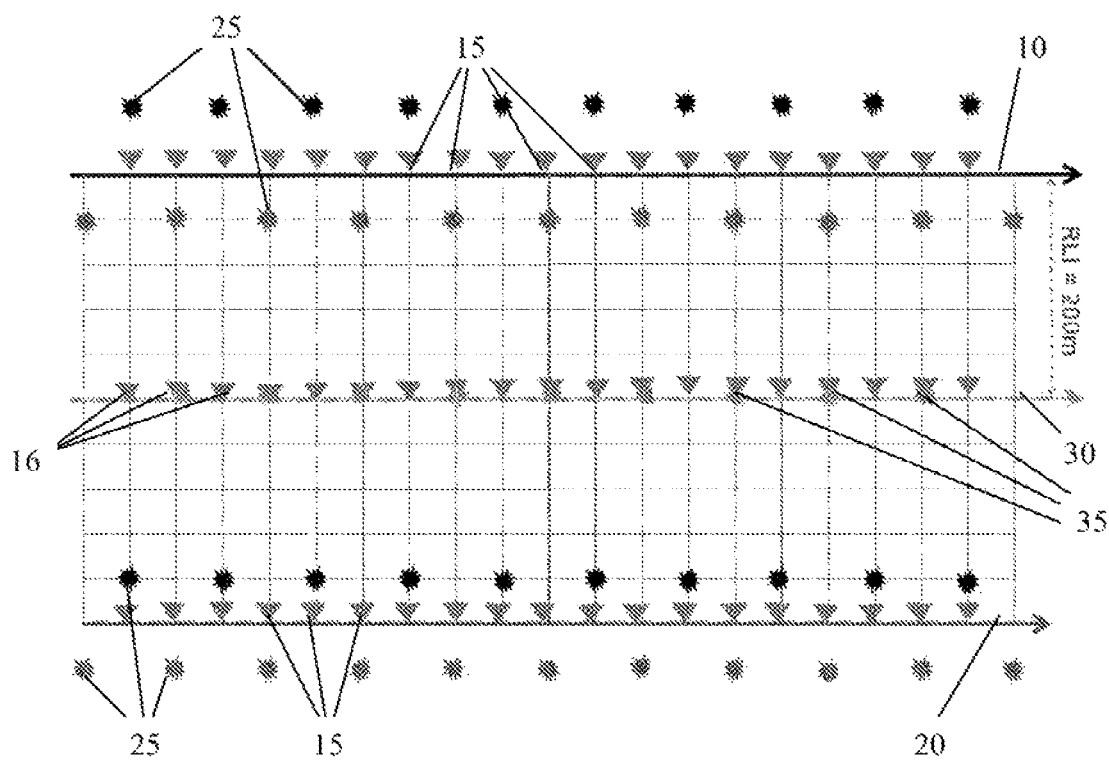
FIG. 5 is a diagram showing an example of linear acquisition geometry usable according to the invention for obtaining 3D seismic images.

In the embodiment illustrated diagramatically in FIG. 5, the number of receiver lines is increased by adding to the above-described first lines 10, 20 second receiver lines 30 parallel to these first lines and located at intermediate positions between the first lines 10, 20. In the example illustrated, the distance RLI between the receiver lines is 200 m, whereas the distance SLI between the source lines is 400 m. In the second line 30 located approximately halfway between two first adjacent lines 10, 20, geophones 16 belonging to wireless equipment transportable in mountainous areas are typically used, without requiring heavy works of preparation and return to initial condition of the site.

In FIG. 5, source positions 25 arranged in staggered rows along the first lines 10, 20, like in the case of FIG. 3, are illustrated. It must be noted that the sources of 25 may also be aligned on the first lines 10, 20 as in the configuration of FIG. 2. Other configurations are further possible. Moreover, even though the lines 10, 20, 30 are represented straight in FIGS. 2, 3 and 5, they may in practice have various non-straight shapes, in particular when the measures are performed in mountainous or foothill areas. The acquisition geometry is based on generally parallel lines, with strong anisotropy. The spacing between the receiver lines 10, 20 is typically more than 300 m, whereas the spacing of the receiver positions 15, 16 along the receiver lines 10, 20, 30 is much lower, typically less than 100 m.

Along the second lines 30, real shots are not performed through seismic sources such as explosives or vibrators. Such real shots are only performed along the first lines 10, 20, and result in a recording of seismic data by all the receivers 15, 16, those in the first lines 10, 20 and those in the second lines 30. The seismic data thus collected are then processed by seismic interferometry in order to estimate the response of the receivers 15 of the first lines 10, 20 to virtual shots located at the positions of some of the receivers 16 of the second lines 30.

Seismic interferometry techniques with cross-correlations make it possible to generate new seismic recordings by correlation of existing recordings. They are well-known in the art of seismic data acquisition, and described for example in patent applications WO 2008/070595 A2, WO 2008/070597A2, WO 2008/106511 A1, WO 2010/120418 A1, EP 2 166 378 A2, EP 2 169 431 A2, US 2010/0054083 A1. When a receiver A receives a seismic wave from the subsoil, this wave reflects also at the surface, which sends a reflected component back towards the subsoil. This reflected component may reflect again on shallow structures located in the vicinity of receiver A, and then reach one or more other receivers B. By analyzing the time correlations between the measurements performed by the receivers A and B, transfer functions between receiver positions can be estimated or, in other words, the response at a receiver position B to waves that would be emitted by a virtual source located at another receiver A can be estimated.

The correlation calculations make it possible to expand the data representative of the relatively shallow structures of the explored area. The interferometry techniques thus fulfill the need for increasing the seismic fold, which is particularly desirable for the exploration in foothill areas, without having to install real seismic sources along part of the lines. In the example of FIG. 5, seismic sources 25 are only used along one line out of two. Along the other lines 30, geophones 16 are placed, and the virtual shots are simulated by interferometry at positions 35 corresponding to all or part of the positions of the geophones 16.

The seismic interferometry calculations may be implemented through one or more computers. Each computer may comprise a processor, a memory to store the program data and to run it, a permanent storage system such as one or more hard drives, communications ports to manage the communications with outside devices, particularly for recovering the various data recorded by the receivers 15, 16 during the measurement campaign, and user interfaces such as for example a display, a keyboard, a mouse, etc.

Typically, the calculations are performed by using software modules that can be stored, in the form of program instructions or readable code by the computer and that can be run by the processor, on an appropriate medium such as a read-only memory (ROM), a random access memory (RAM), CD-ROMs, magnetic tapes, diskettes and optical data storing devices. The computer(s) may also be equipped with software modules that will process the seismic data, i.e. those that have been directly measured by receivers 15, 16 and those that have been deduced by seismic interferometry, to generate seismic images by known techniques of 3D migration, particularly reverse time migration (RTM).

The embodiments described above are illustrations of the present invention. Various changes may be brought to them without departing the scope of the invention that results from the attached claims.

The invention claimed is:

1. A method for acquiring seismic data, comprising:
arranging receiver lines in an area to be explored, each receiver line including a plurality of geophones at respective receiver positions for measuring seismic waves from the subsoil, the receiver lines including a plurality of first receiver lines substantially parallel to each other and second receiver lines substantially parallel to the first receiver lines and located at intermediate positions between the first receiver lines;
emitting seismic waves into the subsoil in the area to be explored from source positions located along the first receiver lines;
obtaining first seismic data representing seismic waves measured by the geophones of the first and second receiver lines in response to the emitted seismic waves; and
processing the first seismic data by seismic interferometry to estimate second seismic data representing responses, at at least some of the receiver positions, to seismic waves emitted from a virtual source located at a receiver position along a second receiver line.

2. The method of claim 1, wherein at least some of the geophones of the second receiver lines belong to wireless equipment.

3. The method of claim 1, wherein the spacing between the first receiver lines is greater than 300 m, while the spacing of the receiver positions along the receiver lines is smaller than 100 m.

4. The method of claim 1, wherein the second receiver lines are placed substantially halfway between two adjacent first receiver lines.

5. The method of claim 1, wherein some of the source positions are transversally offset with respect to the receiver positions along the first receiver lines.

6. The method of claim 1, wherein the area to be explored comprises a mountainous or foothill area.

* * * * *